United States Patent
Yu et al.

(10) Patent No.: US 10,191,513 B2
(45) Date of Patent: Jan. 29, 2019

(54) WATERPROOF DISPLAY APPARATUS AND METHOD OF ASSEMBLING THE SAME

(71) Applicant: E Ink Holdings Inc., Hsinchu (TW)

(72) Inventors: Chin-Chi Yu, Hsinchu (TW);
Chih-Chun Chen, Hsinchu (TW);
Shi-Lin Li, Hsinchu (TW);
Hsin-Chung Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/213,416

(22) Filed: Jul. 19, 2016

(65) Prior Publication Data
US 2017/0105304 A1    Apr. 13, 2017

(30) Foreign Application Priority Data
Oct. 13, 2015 (TW) .............................. 104133556 A

(51) Int. Cl.
G06F 1/16 (2006.01)
G02B 26/02 (2006.01)
H04N 5/64 (2006.01)

(52) U.S. Cl.
CPC ......... G06F 1/1628 (2013.01); G02B 26/026 (2013.01); H04N 5/64 (2013.01)

(58) Field of Classification Search
CPC ................................ G06F 1/1628; H04N 5/64
USPC .................... 361/679.55, 679.56, 679.24
See application file for complete search history.

(56) References Cited

U.S. PATENT DOCUMENTS

| 4,731,503 A * | 3/1988 | Kitanishi | G02F 1/13452 174/117 A |
| 4,762,227 A * | 8/1988 | Patterson | A45C 11/24 206/305 |
| 5,812,188 A * | 9/1998 | Adair | A61B 1/00039 128/849 |
| 6,050,407 A * | 4/2000 | Trujillo | H01H 9/0242 206/320 |
| 6,082,535 A * | 7/2000 | Mitchell | A45C 11/00 150/154 |

(Continued)

FOREIGN PATENT DOCUMENTS

CN 101441405 A 5/2009
CN 102686076 A 9/2012

(Continued)

OTHER PUBLICATIONS

Corresponding Taiwanese Office Action that these art references were cited on Oct. 14, 2016.

(Continued)

Primary Examiner — Nidhi Thaker
(74) Attorney, Agent, or Firm — CKC & Partners Co., Ltd.

(57) ABSTRACT

A waterproof display apparatus includes an envelope, a display panel and an adhesive structure. The envelope includes an inner enclosing surface. The inner enclosing surface defines an accommodating space. The display panel is at least partially accommodated in the accommodating space of the envelope. The envelope includes a light permeable portion that allows light from the display panel to travel out of the envelope. The adhesive structure is located in the accommodating space. The adhesive structure is adhered between the inner enclosing surface of the envelope and the display panel.

10 Claims, 2 Drawing Sheets

(56) References Cited

U.S. PATENT DOCUMENTS

| | | | | |
|---|---|---|---|---|
| 6,273,252 B1 * | 8/2001 | Mitchell | ............... | A45C 11/00 |
| | | | | 206/320 |
| 7,941,196 B2 | 5/2011 | Kawasaki et al. | | |
| 8,553,316 B2 | 10/2013 | Tsai et al. | | |
| 8,564,950 B2 * | 10/2013 | Rayner | ............... | G06F 1/1626 |
| | | | | 361/679.55 |
| 2012/0087002 A1 | 4/2012 | Hsieh et al. | | |
| 2015/0374087 A1 * | 12/2015 | Lim | ............... | A45C 11/00 |
| | | | | 224/191 |

FOREIGN PATENT DOCUMENTS

| | | |
|---|---|---|
| CN | 202617556 U | 12/2012 |
| CN | 203027635 U | 6/2013 |
| CN | 103369897 A | 10/2013 |
| CN | 203574707 U | 4/2014 |
| CN | 204316556 U | 5/2015 |
| TW | 201427545 A | 7/2014 |
| TW | D169220 S | 7/2015 |

OTHER PUBLICATIONS

Corresponding Taiwanese Office Action that these art references were cited on Jun. 27, 2016.
Corresponding Chinese office action dated Sep. 4, 2018.

\* cited by examiner

WATERPROOF DISPLAY APPARATUS AND METHOD OF ASSEMBLING THE SAME

RELATED APPLICATIONS

This application claims priority to Taiwan Application Serial Number 104133556, filed Oct. 13, 2015, which is herein incorporated by reference.

BACKGROUND

Technical Field

Embodiments of the present invention relate to a display apparatus. More particularly, embodiments of the present invention relate to a waterproof display apparatus and a method of assembling the same.

Description of Related Art

Since a display panel includes numerous electronic devices therein, it is prone to be affected or even damaged by moisture. In order to prevent the electronic devices from damaged by moisture, an upper waterproof film and a lower waterproof film are adhered to opposite sides of the display panel, and a waterproof glue is coated on a remaining exposed area of the display panel, so as to insulate the display panel from moisture.

In general, the waterproof glue is not only adhered to a side surface of the display panel, but it is also adhered to the lower waterproof film on the lower side of the display panel, so that the waterproof glue can be supported by the lower waterproof film. However, such a waterproof design requires a large space reserved on the waterproof film to benefit the coating process of the waterproof glue. Since such a large space is required, size of the frame of the display apparatus cannot be scaled down, which is disadvantageous to the narrow frame design of the display apparatus.

SUMMARY

One aspect of the present invention discloses a waterproof display apparatus that is able to achieve both the waterproof ability and the narrow frame design.

In accordance with one embodiment of the present invention, a waterproof display apparatus includes an envelope, a display panel and an adhesive structure. The envelope includes an inner enclosing surface. The inner enclosing surface defines an accommodating space. The display panel is at least partially accommodated in the accommodating space of the envelope. The envelope includes a light permeable portion that allows light from the display panel to travel out of the envelope. The adhesive structure is located in the accommodating space. The adhesive structure is adhered between the inner enclosing surface of the envelope and the display panel.

In accordance with another embodiment of the present invention, a waterproof display apparatus includes a display panel and an envelope. The display panel includes a display surface, a rear surface and a plurality of side surfaces. The display surface and the rear surface are respectively located on opposite sides of the display panel. The side surfaces are connected between the display surface and the rear surface. The envelope encloses the display surface, the rear surface and the side surfaces of the display panel. The envelope is joined to the display surface, the rear surface and the side surfaces in a waterproof manner. The envelope includes a light permeable portion that allows light to travel out of the envelope.

In accordance with another embodiment of the present invention, a method of assembling a waterproof display apparatus includes putting a display panel into an accommodating space of an envelope through an opening of the envelope, and joining the display panel to the envelope in a waterproof manner.

In the foregoing embodiments, the display panel can be adhered inside the envelope. Therefore, the envelope can insulate the moisture from invading into the display panel, thereby implementing the waterproof ability. Moreover, since the waterproof ability can be implemented as long as the display panel is enclosed inside the envelope, an additional waterproof film can be omitted, and a space on the waterproof film reserved for the waterproof glue can be omitted as well, which may benefit the narrow frame design.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
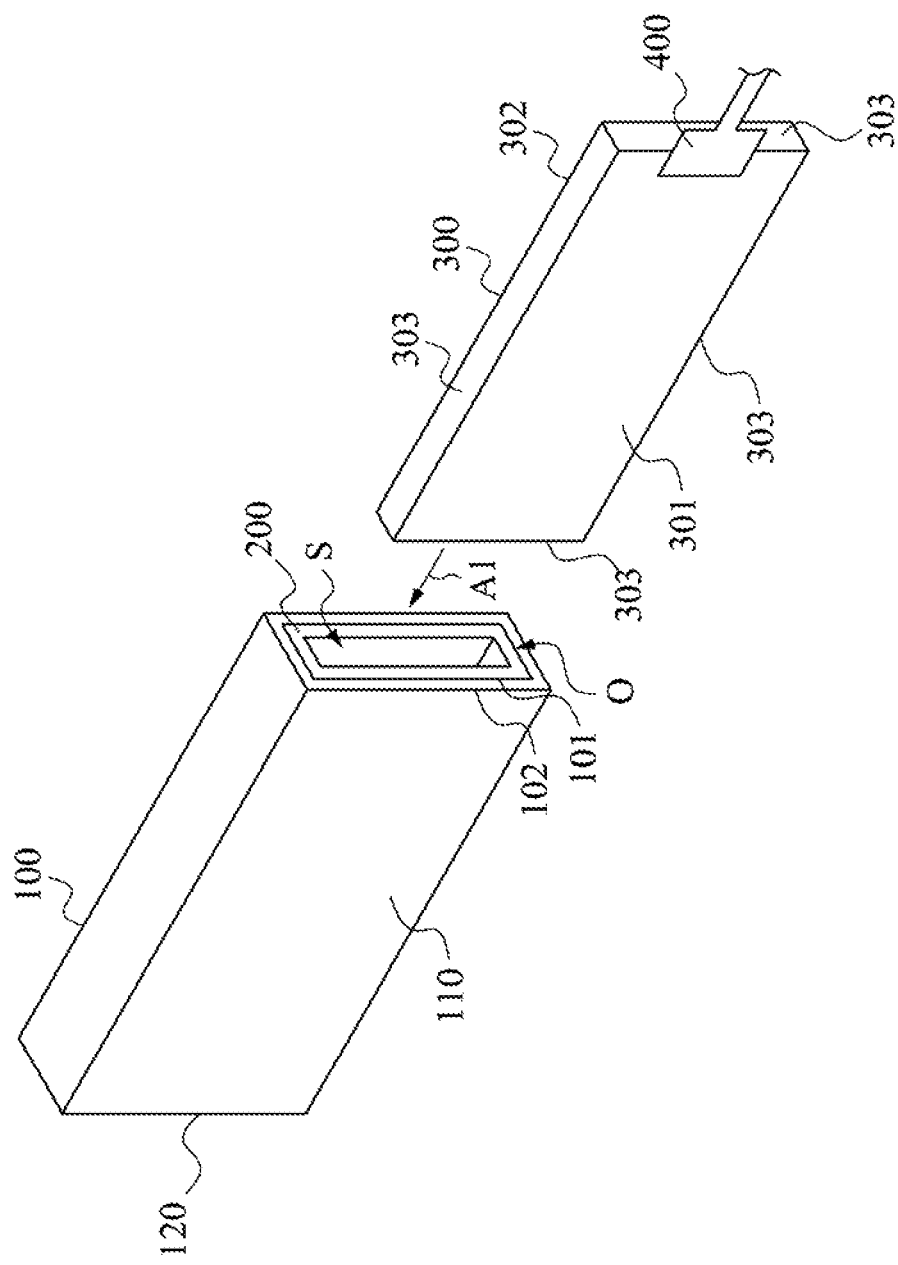
FIG. 1 is an explosive view of a waterproof display apparatus in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
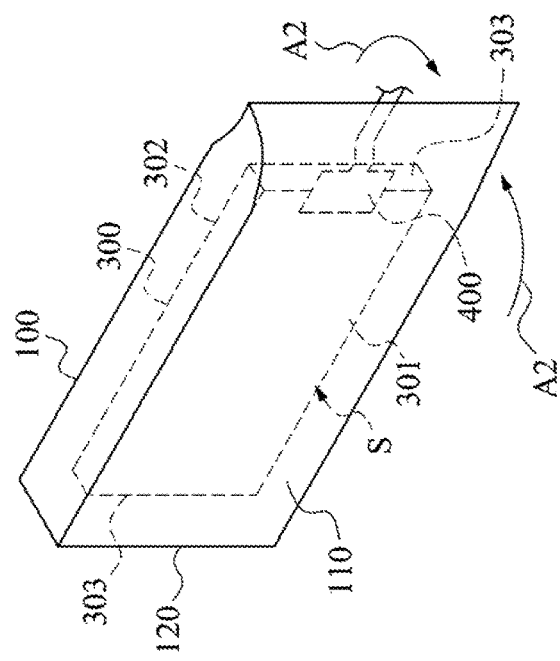
FIG. 2 is a perspective view of an assembled waterproof display apparatus as shown in FIG. 1.

FIG. 1 is an explosive view of a waterproof display apparatus in accordance with one embodiment of the present invention. FIG. 2 is a perspective view of an assembled waterproof display apparatus as shown in FIG. 1. As shown in FIGS. 1 and 2, in this embodiment, the waterproof display apparatus includes an envelope 100, an adhesive structure 200 and a display panel 300. The envelope 100 includes an inner enclosing surface 101 and an outer enclosing surface 102. The inner enclosing surface 101 and the outer enclosing surface 102 are opposite. The outer enclosing surface 102 is exposed or revealed. The inner enclosing surface 101 defines an accommodating space S. The display panel 300 is at least partially accommodated in the accommodating space S of the envelope 100. The adhesive structure 200 is located in the accommodating space S. The adhesive structure 200 is adhered between the inner enclosing surface 101 of the envelope 100 and the display panel 300. Therefore, the envelope 100 can insulate the moisture from invading into the display panel 300, thereby implementing the waterproof ability. Further, since the waterproof ability can be implemented as long as the display panel 300 is enclosed inside the envelope 100, an additional waterproof film can be omitted, and a space on the waterproof film reserved for the waterproof glue can be omitted as well, which may benefit the narrow frame design.

In this embodiment, the envelope 100 includes a light permeable portion 110. The light permeable portion 110 is light permeable or light transmissive, which can allow light from the display panel 300 to travel out of the envelope 100. In a greater detail, the display panel 300 includes a display surface 301. When the display panel 300 is accommodated in the accommodating space S of the envelope 100, the light permeable portion 110 is present in front of the display surface 301. In other words, the display surface 301 faces toward the light permeable portion 110. As such, the light from the display surface 301 can sequentially travel through a portion of the inner enclosing surface 101 and a portion of the outer enclosing surface 102 located on the light permeable portion 110, and can travel out of the envelope 100, so that the user can see the displayed image of the display surface 301 from an exterior with respect to the envelope 100. It is understood that the user can see the display panel 300 omnidirectionally when the whole envelope 100 is light permeable. In other words, the user may not only see the display surface 301, but the user may also see surfaces of the display panel 300 other than the display surface 301. For example, a material of the envelope 100 may be, but is not limiting to, polyethylene terephthalate (PET), polycarbonate (PC), poly(methyl methacrylate) (PMMA) or other suitable light permeable materials. In some embodiments, only the light permeable portion 110 of the envelope 100 in front of the display surface 301 is light permeable, and other portion of the envelope 100 is opaque. In some embodiments, the envelope 100 not only includes a light permeable portion 110 in front of the display surface 301, but also includes another light permeable portion 110 in the rear of the display surface 301. In other words, the both the front and rear surfaces of the envelope 100 are light permeable, which allows the user to see not only the display surface 301 but also other surfaces of the display panel 300 from the front and rear sides of the envelope 100.

In some embodiments, the envelope 100 has an opening O and a sealed portion 120 before the envelope 100 encloses the display panel 300. The sealed portion 120 is sealed, and the opening O is opened. The opening O and the sealed portion 120 are respectively located on two opposite sides of the accommodating space S. For example, as shown in FIG. 1, the sealed portion 120 is located on a left side of the accommodating space S, and the opening O is located on a right side of the accommodating space S and is spatially communicated with the accommodating space S. As such, during a process of assembling the waterproof display apparatus, the display panel 300 can be put into the accommodating space S of the envelope 100 through the opening O of the envelope 100 along the direction A1 as shown in FIG. 1. When the display panel 300 abuts against the sealed portion 120 of the envelope 100, the opening O can be sealed to form the structure as shown in FIG. 2, thereby enclosing the display panel 300 inside the envelope 100.

In some embodiments, as shown in FIGS. 1 and 2, the display panel 300 further includes a rear surface 302. The display surface 301 and the rear surface 302 are respectively located on opposite sides of the display panel 300. The display surface 301 and the rear surface 302 are adhered to the inner enclosing surface 101 of the envelope 100 by the adhesive structure 200. In other words, a portion of the adhesive structure 200 is located between and adhered to the inner enclosing surface 101 of the envelope 100 and the display surface 301 of the display panel 300. A portion of the adhesive structure 200 is located between the inner enclosing surface 101 of the envelope 100 and the rear surface 302 of the display panel 300. As a result, the adhesive structure 200 can prevent the moisture from invading into the display panel 300 through the display surface 301 and/or the rear surface 302.

Figure 3:
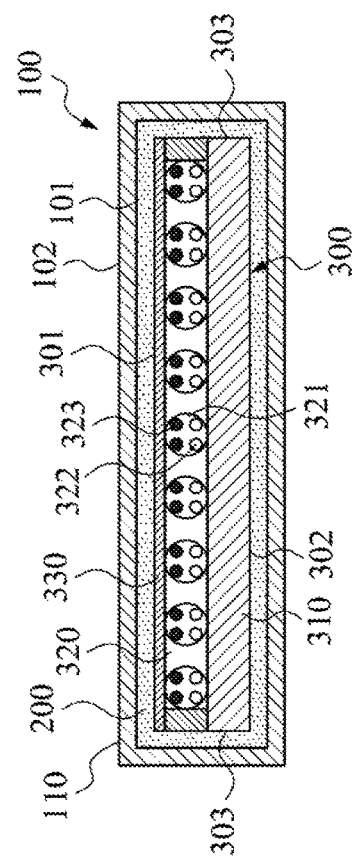
FIG. 3 is a cross-sectional view of the waterproof display apparatus of FIG. 2.

In some embodiments, the display panel 300 can be partially exposed or revealed outside the envelope 100. In some embodiments, the display panel 300 can be not exposed or revealed outside the envelope 100, so as to further improve the waterproof ability. In other words, the display panel 300 can be completely enclosed inside the envelope 100. Therefore, the envelope 100 may preferably insulate the moisture from the display panel 300, thereby improving the waterproof ability, in a greater detail, reference can be made to FIG. 3, which is a cross-sectional view of the waterproof display apparatus of FIG. 2. As shown in FIG. 3, the display panel 300 further includes a plurality of side surfaces 303. The side surfaces 303 are connected between the display surface 301 and the rear surface 302. The envelope 100 can enclose the display surface 301, the rear surface 302 and the side surfaces 303 of the display panel 300, thereby completely enclosing the display panel 300. As a result, the envelope 100 can preferably insulate the moisture from the display panel 300 to improve the waterproof ability.

In some embodiments, the envelope 100 is joined to the display surface 301, the rear surface 302 and the side surfaces 303 in a waterproof manner. "One element is joined to another element in a waterproof manner" in the context means that attachment strength of these element is strong enough to resist liquid or gas under normal pressure from flowing or penetrating from one element to another element. In particular, a material of the adhesive structure 200 can be a waterproof glue and can be adhered between the envelope 100 and the display surface 301, the rear surface 302 and the side surface 303 of the display panel 300. In other words, the adhesive structure 200 can be an annular structure. This annular structure surrounds and is adhered to the display panel 300. Therefore, even though the moisture may invade into the envelope 100 in some cases, the adhesive structure 200 can prevent the moisture from further invading into the display panel 300. In some embodiments, the adhesive structure 200 encloses the display panel 300, and the adhesive structure 200 is adhered between all outer surfaces of the display panel 300 and the inner enclosing surface 101 of the envelope 100, so as to benefit the envelope 100 and the display panel 300 joined in a waterproof manner. For example, a material of the adhesive structure 200 can be, but is not limiting to, a light-cured light permeable glue, a heat-cured light permeable glue or optical clearance adhesives having appropriate water tightness.

Take the light-cured light permeable glue as an example, during a process of joining the envelope 100 and the display panel 300, the display panel 300 can be put into the accommodating space S of the envelope 100 through the opening O of the envelope 100 along the direction A1 as shown in FIG. 1. Then, an adhesive material, such as the light-cured light permeable glue, between the envelope 100 and the display panel 300 can be cured in a light curing manner, thereby joining the display panel 300 into the envelope 100 in a waterproof manner. In the foregoing assembling process, since the light-cured light permeable glue is flowable before it is emitted by light within a particular wavelength range, the display panel 300 can be moved in the envelope 100. When the display panel 300 is moved to a desired position, the light-cured light permeable glue can be emitted by the light within a particular wavelength range, so that the light-cured light permeable glue can be cured. Therefore, the display panel 300 can be joined inside the envelope 100 in a waterproof manner. For example, in some embodiments, the light-cured light permeable glue can be, but is not limiting to, a UV curing resin, which can be cured by emission of ultraviolet light, so as to join the display panel 300 and the envelope 100.

Take the heat-cured light permeable glue as an example, during a process of joining the envelope 100 and the display panel 300, the display panel 300 can be put into the accommodating space S of the envelope 100 through the opening O of the envelope 100 along the direction A1 as shown in FIG. 1. Then, an adhesive material, such as the heat-cured light permeable glue, between the envelope 100 and the display panel 300 can be cured in a heat curing manner, thereby joining the display panel 300 within the envelope 100 in a waterproof manner. In the foregoing assembling process, since the heat-cured light permeable glue is flowable before it is heated, the display panel 300 can be moved with respect to the envelope 100 when it is accommodated in the envelope 100. When the display panel 300 is moved to a desired position, the heat-cured light permeable glue can be heated, so that the heat-cured light permeable glue can be cured. Therefore, the display panel 300 can be joined inside the envelope 100 in a waterproof manner. For example, in some embodiments, the heat-cured light permeable glue can be, but is not limiting to, a thermosetting resin, which can be cured when it is heated to particular temperature, so as to join the display panel 300 and the envelope 100.

In some embodiments, a thickness of the adhesive structure 200 ranges from 10 micron to 100 micron. The adhesive structure 200 having the thickness within the foregoing range is thick enough to prevent the moisture from invading into the display panel 300. It is understood that "a parameter ranges from A to B" not only means that the parameter can be any value greater than A and less than B, but also means that the parameter can be equal to A or B. For example, "the adhesive structure 200 ranges from 10 micron to 100 micron" not only means that the thickness of the adhesive structure 200 can be any value greater than 10 micron and less than 100 micron, the thickness of the adhesive structure can be 10 micron or 100 micron as well.

In some embodiments, the envelope 100 is flexible. In other words, the envelope 100 is deformable when it endures an external force. Therefore, even though an original contour of the inner enclosing surface 101 does not conform to a contour of the display panel 300, an assembler can exert a force to deform the envelope 100, so that the contour of the inner enclosing surface 101 can conform to the contour of the display panel 300. Therefore, the inner enclosing surface 101 can be tightly adhered to the display panel 300, and the opening O can be sealed such that the envelope 100 can enclose the display panel 300. In particular, when the display panel 300 is put into the accommodating space S of the envelope 100 along the direction A1 shown in FIG. 1, a force may be exerted to the envelope 100 along the direction A2 shown in FIG. 2 to press against the envelope 100 and the display panel 300, so that the inner enclosing surface 101 can tightly press against the display panel 300. When the inner enclosing surface 101 tightly presses against the display panel 300, the adhesive material therebetween can be cured to form the adhesive structure 200, such that the attachment strength between the envelope 100 and the display panel 300 is strong enough to resist the flowing or penetrating liquid, thereby preventing moisture from invading into the display panel 300.

In some embodiments, a material of the envelope 100 may be a waterproof material for preventing the moisture from invading into the envelope 100, so as to further ensure that the display panel 300 will not be affected by the moisture. For example, the material of the envelope 100 can be, but is not limited to, polyethylene terephthalate (PET) or polycarbonate (PC). In some embodiments, a light-permeable waterproof material is coated on the material of the envelope 100 to achieve light-permeable, flexible and waterproof ability. In some embodiments, when the material of the envelope 100 is the waterproof material, the material of the adhesive structure 200 may not be the waterproof glue. In other words, the waterproof ability of the waterproof display apparatus can be solely achieved by the envelope 100. In some embodiments, when the material of the adhesive structure 200 is the waterproof glue, the material of the envelope 100 may be a non-waterproof material. In other words, the waterproof ability of the waterproof display apparatus can be solely achieved by the adhesive structure 200. In some embodiments, the material of the envelope 100 is the waterproof material, and the material of the adhesive structure 200 is the waterproof glue. In other words, the waterproof ability of the waterproof display apparatus can be achieved by the envelope 100 and the adhesive structure 200 cooperatively; thereby preventing the moisture from invading into the display panel 300 more effectively.

In some embodiments, a thickness of the envelope 100 ranges from 10 micron to 100 micron. The envelope 100 having the thickness within the foregoing range is thick enough to prevent the moisture from invading into the adhesive structure 200, thereby preventing the moisture from invading into the display panel 300 through the adhesive structure 200. Moreover, the envelope 100 having the thickness within the foregoing range is thin enough such that the envelope 100 is flexible, which benefits the assembler to exert a force to the envelope 100 to deform the envelope 100 and therefore benefits the inner enclosing surface 101 to be tightly adhered to the display panel 300, thereby sealing the opening O.

In some embodiments, as shown in FIGS. 1 and 2, the waterproof display apparatus further includes a circuit board 400. The circuit board 400 overlaps with the display panel 300 and is electrically connected to the display panel 300. Therefore, the control devices on the circuit board 400 (not shown in the figure) can transmit control signals to the display panel 300 for controlling the display panel 300 to render images. In some embodiments, when the display panel 300 is accommodated in the accommodating space S of the envelope 100, at least a portion of the circuit board 400 is located in the accommodating space 5, and this portion of the circuit board 400 and the display panel 300 are adhered by the adhesive structure 200 (See FIG. 1). As a result, the adhesive structure 200 not only achieves waterproof ability, but it also benefits fastening the circuit board 400 and the display panel 300. In some embodiments, another portion of the circuit board 400 is not adhered by the adhesive structure 200 and is located outside the envelope 100, so as to electrically connect to the electrical devices outside the envelope 100. In some embodiments, a waterproof glue can be coated on the another portion of the circuit board 400, which is not adhered by the adhesive structure 200, and the edge of the opening O (See FIG. 1) of the envelope 100, so as to reduce the gap between the envelope 100 and the circuit board 400, thereby improving the water tightness and the waterproof ability. For example, the circuit board 400 may be, but is not limited to, a flexible printed circuit (FPC).

In some embodiments, the display panel 300 may be, but is not limited to, an electrophoretic display (EPD), a liquid crystal display (LCD), an electro wetting display (EWD), or an organic light emitting diode (OLED) display. For example, as shown in FIG. 3, the display panel 300 may be the electrophoretic display, which includes a driving substrate 310, an electrophoretic display medium layer 320 and a light permeable cover 330. The electrophoretic display medium layer 320 is located between the driving substrate 310 and the light permeable cover 330. The driving substrate 310 can generate an electric field to control the electrophoretic display medium layer 320 to render an image. In a greater detail, the electrophoretic display medium layer 320 may include a plurality of microcapsules 321. Each microcapsule 321 has a plurality of light-colored charged particles 322 and a plurality of deep-colored charged particles 323 therein. The light-colored charged particles 322 and the deep-colored charged particles 323 have charges of different types. For example, the light-colored charged particles 322 may have positive charges, and the deep-colored charged particles 323 may have negative charges. Therefore, the electric field generated by the driving substrate 310 can control locations of the light-colored and deep-colored charged particles 322 and 323 in each microcapsule 321, thereby rendering a grayscale image. In some embodiments, the display panel 300 further includes a color filter to render a colored image. In some embodiments, the driving substrate 310 is a thin film transistor (TFT) array substrate, which has a plurality of pixel electrodes (not shown) to individually control microcapsules 321 in different zones. In some embodiments, the light permeable cover 330 has a common electrode (not shown) proximal to the electrophoretic display medium layer 320, so that the common electrode and the pixel electrodes of the driving substrate 310 can cooperatively control the microcapsules 321 in the electrophoretic display medium layer 320.

In some embodiments, since the display panel 300 can be enclosed by the envelope 100 the envelope 100 can prevent the moisture from invading into the driving substrate 310, the electrophoretic display medium layer 320 and/or the light permeable cover 330, thereby preventing the devices in the driving substrate 310, the electrophoretic display medium layer 320 and/or the light permeable cover 330 from being damaged by the moisture.

In some embodiments, after the display panel 300 is enclosed by the envelope 100, a vacuum source (not shown) can be employed to suck gas between the envelope 100 and the display panel 300 such that the envelope 100 is tightly joined on the display panel 300, thereby preventing invasion of the moisture more effectively. In another embodiment, after the display panel 300 is enclosed by the envelope 100, a heat source can be employed to heat the envelope 100 such that the envelope 100 is tightly joined to the display panel 300.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A waterproof display apparatus, comprising:
   an envelope comprising an inner enclosing surface that defines an accommodating space;
   a display panel at least partially accommodated in the accommodating space of the envelope, the envelope comprising a light permeable portion that allows light from the display panel to travel out of the envelope; and
   an adhesive structure located in the accommodating space, wherein the adhesive structure is adhered between the inner enclosing surface of the envelope and an entirety of the display panel, and wherein the adhesive structure is an annular structure that surrounds and adheres to the display panel.

2. The waterproof display apparatus of claim 1, wherein the display panel is not exposed outside the envelope.

3. The waterproof display apparatus of claim 1, wherein the envelope is flexible.

4. The waterproof display apparatus of claim 1, wherein a contour of the display panel conforms to a contour of the inner enclosing surface of the envelope.

5. The waterproof display apparatus of claim 1, wherein a material of the envelope is a light permeable material.

6. The waterproof display apparatus of claim 1, wherein a material of the adhesive structure is a light-cured light permeable glue or a heat-cured light permeable glue.

7. The waterproof display apparatus of claim 1, further comprising a circuit board overlapping with the display panel, wherein a portion of the circuit board is located in the accommodating space of the envelope, and wherein the display panel and the portion of the circuit board are adhered by the adhesive structure.

8. The waterproof display apparatus of claim 1, wherein the display panel comprises a display surface and a rear surface respectively located on opposite sides of the display panel, and wherein the display panel and the rear surface are adhered to the inner enclosing surface of the envelope by the adhesive structure.

9. The waterproof display apparatus of claim 8, wherein the display panel comprises a plurality of side surfaces, wherein the side surfaces are connected between the display surface and the rear surface, and wherein the side surfaces are adhered to the inner enclosing surface of the envelope by the adhesive structure.

10. A waterproof display apparatus, comprising: a display panel comprising a display surface, a rear surface and at least three side surfaces, wherein the display surface and the rear surface are respectively located on opposite sides of the display panel, and wherein the side surfaces are connected between the display surface and the rear surface; and an envelope enclosing the display surface, the rear surface and the side surfaces of the display panel, wherein the envelope is directly joined to the display surface, the rear surface and the three side surfaces by an annular adhesive structure, and wherein the envelope comprises a light permeable portion that allows light to travel out of the envelope.

\* \* \* \* \*